United States Patent
Nonomiya

(10) Patent No.: US 8,322,677 B2
(45) Date of Patent: Dec. 4, 2012

(54) SLIDE STRUCTURE OF VEHICLE SEAT

(75) Inventor: Masaaki Nonomiya, Yokohama (JP)

(73) Assignee: NHK Spring Co., Ltd., Yokohama-shi (JP)

( * ) Notice: Subject to any disclaimer, the term of this patent is extended or adjusted under 35 U.S.C. 154(b) by 175 days.

(21) Appl. No.: 12/806,144

(22) Filed: Aug. 6, 2010

(65) Prior Publication Data
US 2011/0057086 A1    Mar. 10, 2011

(30) Foreign Application Priority Data

Sep. 3, 2009 (JP) ................................ 2009-203460

(51) Int. Cl.
*F16M 13/00* (2006.01)
(52) U.S. Cl. ...................................... 248/430; 297/344.1
(58) Field of Classification Search .................. 248/424, 248/425, 429, 430; 297/344.1
See application file for complete search history.

(56) References Cited

U.S. PATENT DOCUMENTS

| | | | | |
|---|---|---|---|---|
| 5,222,814 A | * | 6/1993 | Boelryk | 384/47 |
| 5,893,545 A | * | 4/1999 | Lyons et al. | 248/420 |
| 6,145,914 A | * | 11/2000 | Downey et al. | 296/65.18 |
| 6,264,158 B1 | * | 7/2001 | Downey et al. | 248/422 |
| 6,318,696 B1 | * | 11/2001 | Downey et al. | 248/430 |
| 6,354,553 B1 | * | 3/2002 | Lagerweij et al. | 248/430 |
| 7,048,244 B2 | * | 5/2006 | Hauck | 248/430 |

* cited by examiner

Primary Examiner — Terrell McKinnon
Assistant Examiner — Steven Marsh
(74) Attorney, Agent, or Firm — Flynn, Thiel, Boutell & Tanis, P.C.

(57) ABSTRACT

There is provided a slide structure of a vehicle seat comprises a stationary outer rail, a movable inner rail, and means for locking said movable inner rail which locks said movable inner rail against said stationary outer rail in the longitudinal direction, said movable inner rail fits with said stationary outer rail in such a way that opening portions formed by the respective C-shaped cross-sections face each other, a retainer extending in the longitudinal direction is provided between said stationary outer rail and said movable inner rail, said retainer includes a retaining portion for retaining a ball rolling between said two rails, said movable side surface, said stationary side surface and said retainer side surface portion are all disposed along the vertical direction of the vehicle, whereby each of said stationary outer rail and said movable inner rail is arranged to form a vertically elongated cross-section.

9 Claims, 15 Drawing Sheets (A)

(B)

SLIDE STRUCTURE OF VEHICLE SEAT

FIELD OF THE INVENTION

The present invention relates to a slide structure of a vehicle seat, particularly relates to the slide structure of the vehicle seat which is capable of always and reliably maintaining a fitting relationship between a movable rail and a stationary rail.

BACKGROUND OF THE INVENTION

Conventionally, a slide structure has been provided on a seat cushion of a vehicle seat to position, and thus fix the vehicle seat at a desired position in a longitudinal direction of the vehicle through the seat cushion.

Explaining about the slide structure, it comprises an upper rail fixed on the seat cushion and a lower rail fixed on a floor of the vehicle. Both of the rails are disposed to extend in the longitudinal direction. More specifically, the upper rail fits with the lower rail so as to be slidable in the longitudinal direction.

The upper rail has been conventionally disposed above the lower rail disposed on the floor of the vehicle. The present inventor improved such a conventional slide structure. As shown in FIG. 14, both of the upper and lower rails were arranged to be vertical. That means that a vertical cross-section of the rail structure generally comprising a movable outer rail 702 corresponding to the upper rail, a stationary inner rail 704 corresponding to the lower rail, and a retainer was shaped to be elongated in the vertical direction. This causes a section modulus to be effectively secured with respect to a bending moment about a neutral line extending in the widthwise direction of the vehicle in the vertical cross-section of the rail structure, as compared with that with a cross-section shaped to be elongated in the horizontal direction.

Accordingly, the weight of the slide structure can be decreased by limiting the increase of the thickness of the rail, for instance, while at the same time a necessary strength thereof can be effectively secured.

However, the present inventor found out that such a slide structure raises a new following technical problem.

More specifically, upon a collision of the vehicle, a fitting relationship between the movable outer rail 702 and the stationary inner rail 704 is removed due to an impact load, so that a sliding function associated with the rails is lost.

In particular, a belt load acts on a rear portion of the movable outer rail 702 through a buckle portion 706 upon the collision, for instance. In such a case, since the belt is arranged to extend inwardly, diagonally and forwardly from a lower end of the one of the sides of the seat back, to an upper end of the other of the sides thereof, as shown in an arrow in FIG. 14, components of the belt load in three directions, these are, the one in the widthwise direction of the vehicle, the one in the vertical direction thereof, and the one in the longitudinal direction thereof are inevitably generated.

Especially, the component in the widthwise direction acts inwardly in the widthwise direction. Since a rail structure of the slide structure has only a clearance of about a few millimeters relative to the side frame of the seat cushion due to a limited space within the vehicle, the movable outer rail 702 extending in the longitudinal direction is caused to deform toward the one of the outer surfaces of the pair of the side frames S of the seat cushion C disposed inside of the movable outer rail 702 due to the component of the belt load in the widthwise direction.

This causes a load oriented outwardly in the widthwise direction, that is, opposite to the component of the belt load in the widthwise direction, to be exerted on the front portion of the movable outer rail 702 with a position of the movable outer rail 702 where it contacts the one of the outer surfaces of the pair of the side frames S being a fulcrum.

In such a case, since the movable outer rail 702 is disposed outside of the stationary inner rail 704, which is supported, and thus fixed by a leg 708 from inside, in the widthwise direction, a fitting relationship between the movable outer rail 702 and the stationary inner rail 704 is created with an opening portion of the C-shaped cross-section of the movable outer rail 702 being oriented inwardly in the widthwise direction, while an opening portion of the C-shaped cross-section of the stationary inner rail 704 being oriented outwardly in the widthwise direction. As shown in an arrow in FIG. 15, due to the load oriented outwardly in the widthwise direction, a force acts on the movable outer rail 702 so as to move its opening portion of the C-shaped cross-section away from the stationary inner rail 704, while another force as a reaction force to said force acts on the stationary inner rail 704 so as to move its opening portion of the C-shaped cross-section away from the movable outer rail 702, and thus, the fitting relationship between said two rails is removed.

Accordingly, a phenomenon in which a sliding function associated with said two rails is lost due to a belt load upon the collision can be caused. A relief of an injured passenger due to the collision can become too late because of such a phenomenon.

SUMMARY OF THE INVENTION

In view of the above technical problems, an object of the present invention is to provide a slide structure of a vehicle seat which is capable of always and reliably keeping a fitting relationship between movable and stationary rails.

In view of the above technical problems, according to an aspect of the invention, there is provided a slide structure of a vehicle seat comprises a stationary outer rail which is fixed on a vehicle floor and extends in a longitudinal direction of a vehicle, a movable inner rail which fits with said stationary outer rail and is slidable in the longitudinal direction of the vehicle relative to said stationary outer rail and is fixed on a seat cushion and on a rear end portion of which a belt buckle for a passenger is fixed, and means for locking said movable inner rail which locks said movable inner rail against said stationary outer rail in the longitudinal direction, said movable inner rail includes a movable side surface extending in the longitudinal direction of the vehicle to form a substantially C-shaped cross-section, said stationary outer rail includes a stationary side surface extending in the longitudinal direction of the vehicle to form a substantially C-shaped cross-section, said movable inner rail fits with said stationary outer rail in such a way that opening portions formed by the respective C-shaped cross-sections faces each other, a retainer extending in the longitudinal direction is provided between said stationary outer rail and said movable inner rail, said retainer includes a retainer side surface portion extending in the longitudinal direction to form a substantially C-shaped cross-section, said retainer includes a retaining portion for retaining said ball, whereby said movable inner rail can be moved in the longitudinal direction along with said retainer relative to said stationary outer rail by said ball rolling between said stationary outer rail and said movable inner rail, said movable side surface, said stationary side surface and said retainer side surface portion are all disposed along the vertical direction of the vehicle, whereby each of said stationary outer rail and said movable inner rail is arranged to form a vertically elongated cross-section, said movable inner rail includes a first arcuate cross-sectional groove, said stationary outer rail includes a second arcuate cross-sectional groove, a guiding groove for guiding the ball in the longitudinal direction is formed by said first arcuate cross-sectional groove and said second arcuate cross-sectional groove.

According to the above slide structure of the vehicle seat, the vehicle seat can be positioned at a desired position in the longitudinal direction of the vehicle by moving the movable inner rail extending in the longitudinal direction and fixed on the seat cushion relative to the stationary outer rail extending in the longitudinal direction and fixed on the vehicle floor, in the longitudinal direction.

More specifically, in a case where the longitudinal position of the seat cushion is adjusted, the ball retained by the retainer between the movable inner rail and the stationary outer rail is caused to roll between the groove formed by the first arcuate cross-sectional groove of the movable inner rail and the second arcuate cross-sectional groove of the stationary outer rail, and between the groove formed by the first arcuate cross-sectional groove of the movable inner rail and the second arcuate cross-sectional groove of the stationary outer rail, so that the movable inner rail can be smoothly moved along with the retainer in the longitudinal direction relative to the stationary outer rail.

In such a case, the belt load acts on the rear portion of the movable inner rail through the belt buckle for the passenger upon the collision of the vehicle, for instance, and since the belt extends inwardly, forwardly and diagonally from the lower end of the one side portion of the seat back to the other side portion thereof, the belt load inevitably consists of a component in the widthwise direction of the vehicle, one in the vertical direction of the vehicle, and one in the longitudinal direction of the vehicle. Especially, the component in the widthwise direction acts inwardly in the widthwise direction. Due to such a component in the widthwise direction, the movable inner rail extending in the longitudinal direction is deformed so as to be flexed toward the outer side surface of one of the pair of side frames of the seat cushion disposed inside of the movable inner rail, to contact said outer side surface at its intermediate position in the longitudinal direction. This causes a load to act on the front portion of the movable inner rail in the direction opposite to the direction of the component in the widthwise direction of the belt load, that is, outwardly in the widthwise direction, with a position of the movable inner rail where it contacts the one of the outer side surface of the pair of side frames being the fulcrum.

In this connection, since the movable inner rail is disposed in the widthwise direction inside of the stationary outer rail fixed and thus supported from outside in the widthwise direction, and the movable inner rail fits with the stationary outer rail in such a way that the open portion of the C-shaped cross-section of the movable inner rail is oriented outwardly in the widthwise direction, while the open portion of the C-shaped cross-section of the stationary outer rail is oriented inwardly in the widthwise direction, due to the load outwardly in the widthwise direction, a force acts on the movable inner rail with its opening portion of the C-shaped cross-section being oriented toward the stationary outer rail, while another force as a reaction force to said force acts on the stationary outer rail with its opening portion of the C-shaped cross-section being oriented toward the movable inner rail, so that the fitting relationship between the movable inner rail and the stationary outer rail can be maintained.

Accordingly, the conventional phenomenon in which the fitting relationship between the movable and stationary rails are removed due to the belt load upon the collision of the vehicle so that sliding function associated with the rails is lost can be effectively prevented.

In another embodiment of the present invention, said movable inner rail further comprises a first protruding movable surface protruding from the one of the edges of said movable side surface, and a second protruding movable surface protruding from the other of the edges of said movable side surface, said stationary outer rail further comprises a first protruding stationary surface protruding from the one of the edges of said stationary side surface, and a second protruding stationary surface protruding from the other of the edges of said stationary side surface, said retainer further comprises a plurality of first retainer protruding upper surfaces each protruding from the one of the edges of said retainer side surface and spaced part from each other with a predetermined distance in the longitudinal direction, and a plurality of second retainer protruding lower surfaces protruding from the other of the edges of said retainer side surface and spaced part from each other with a predetermined distance in the longitudinal direction, said retainer is positioned in such a way that said plurality of first retainer protruding upper surfaces are disposed between said first protruding movable surface and said first protruding stationary surface, while said plurality of second retainer protruding lower surfaces are disposed between said second protruding movable surface and said second protruding stationary surface, said retaining portion is formed on said plurality of first retainer protruding upper surfaces and said plurality of second retainer protruding lower surfaces, respectively, whereby said movable inner rail can be moved in the longitudinal direction along with said retainer relative to said stationary outer rail by said ball rolling between said first protruding movable surface and said first protruding stationary surface, and between said second protruding movable surface and said second protruding stationary surface, said first arcuate cross-sectional groove is formed on said first protruding movable surface and said second protruding movable surface, respectively, said second arcuate cross-sectional groove is formed on said first protruding stationary surface and said second protruding stationary surface, respectively.

According to the above slide structure of the vehicle seat, in a case where the longitudinal position of the seat cushion is adjusted, by moving the movable inner rail in the longitudinal direction relative to the stationary outer rail, the ball retained by the retainer between the movable inner rail and the stationary outer rail is caused to roll between the groove formed by the first arcuate cross-sectional groove of the first protruding movable surface of the movable inner rail and the second arcuate cross-sectional groove of the first protruding stationary surface of the stationary outer rail, and between the groove formed by the first arcuate cross-sectional groove of the second protruding movable surface of the movable inner rail and the second arcuate cross-sectional groove of the second protruding stationary surface of the stationary outer rail, so that the movable inner rail can be smoothly moved along with the retainer in the longitudinal direction relative to the stationary outer rail.

In another embodiment of the present invention, said movable inner rail fits over said stationary outer rail in such a way that the opening portions formed by the respective C-shaped cross-sections face each other, said retainer is disposed on said stationary outer rail in such a way that the opening portions formed by the respective C-shaped cross-sections face each other, said first arcuate cross-sectional grooves are formed on the inner surfaces of said first and second protruding movable surfaces, respectively, while said second arcuate cross-sectional grooves are formed on the outer surfaces of said first and second protruding stationary surfaces, respectively.

In another embodiment of the present invention, said movable inner rail fits into said stationary outer rail in such a way that the opening portions formed by the respective C-shaped cross-sections face each other, said retainer is disposed on said movable inner rail in such a way that the opening portions formed by the respective C-shaped cross-sections face each other, said first arcuate cross-sectional grooves are formed on the outer surfaces of said first and second protruding movable surfaces, respectively, while said second arcuate cross-sectional grooves are formed on the inner surfaces of said first and second protruding stationary surfaces, respectively.

In another embodiment of the present invention, a bracket for reinforcing said movable inner rail which is closely attached to a portion corresponding to said first arcuate cross-sectional groove so as to be applied to said portion from outside is provided on a rear end portion of said movable inner rail, said bracket for reinforcing said movable inner rail includes at its lower surface a reinforcing bead for preventing deformation of said movable inner rail, a bracket for preventing deformation of said stationary outer rail which is closely attached to a portion corresponding to said second arcuate cross-sectional groove so as to be applied to said portion from inside is provided on a rear end portion of said stationary outer rail.

In another embodiment of the present invention, said stationary outer rail includes at its front and rear sides a stationary bracket fixed on a vehicle floor, respectively, said bracket for reinforcing said movable inner rail is provided on a portion of said movable inner rail which overhangs rearwardly from said stationary bracket at the rear side when said movable inner rail is located to be the most rear position relative to said stationary outer rail.

In another embodiment of the present invention, said bracket for reinforcing said movable inner rail is a plate with a substantially C-shaped cross-section.

In another embodiment of the present invention, said bracket for reinforcing said stationary outer rail is a plate each of front and rear end portions of which includes a portion which is applied to said stationary outer rail.

In another embodiment of the present invention, said bracket for reinforcing said stationary outer rail is fastened along with said stationary outer rail to said stationary bracket for fixing said stationary outer rail on the vehicle floor.

DETAILED DESCRIPTION OF EMBODIMENTS OF THE INVENTION

The embodiment of the present invention in which the seat for the vehicle is applied to a front seat of an automobile will be described in detail with reference to the drawings as an example.

Figure 1:
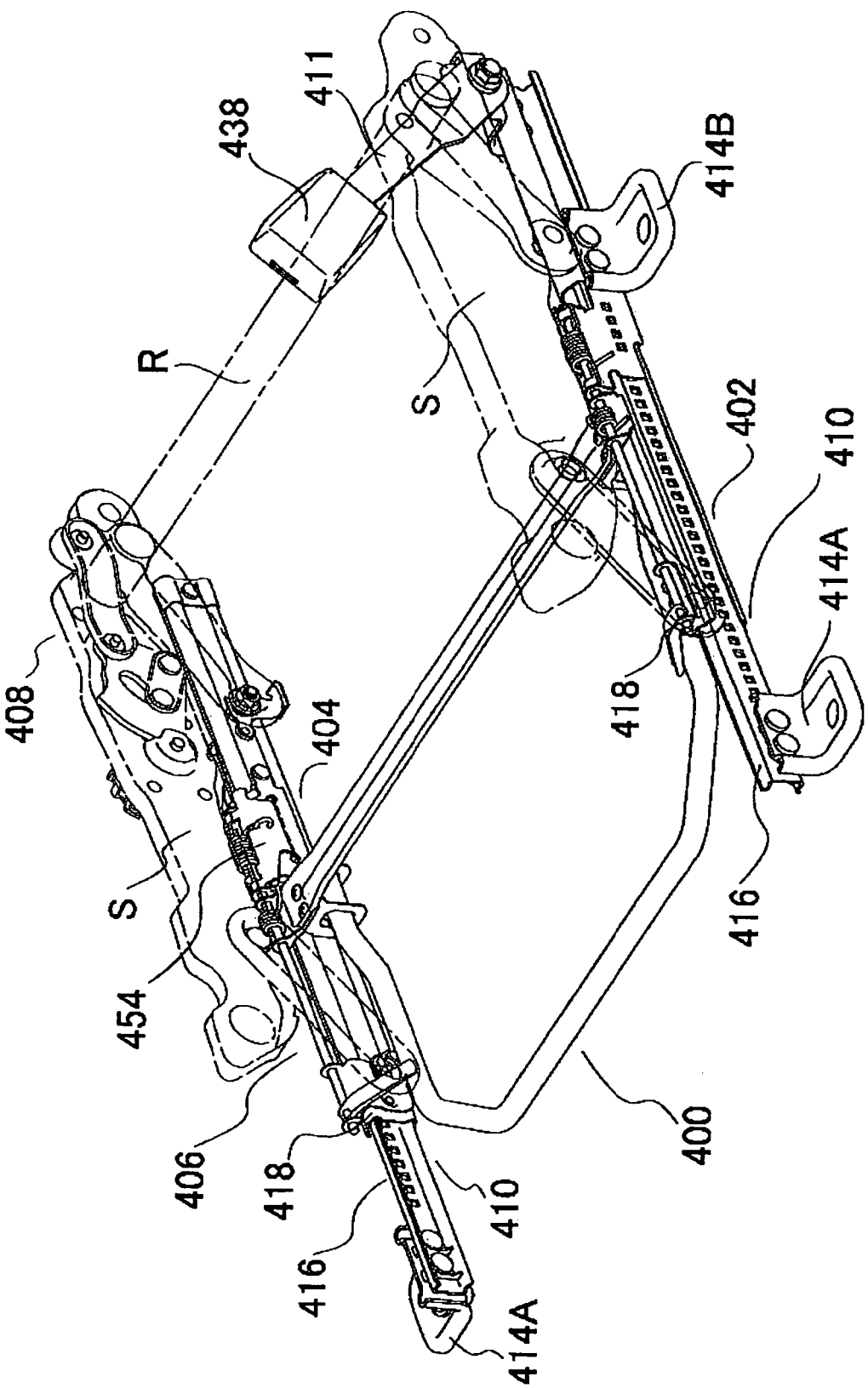
FIG. 1 is a perspective view showing a slide structure of a vehicle seat of the embodiment of the present invention.

As shown in FIG. 1, a slide structure 400 of the vehicle seat generally comprises a mechanism 402 for adjusting the longitudinal position of the vehicle seat, a mechanism 404 for positioning the vehicle seat in the longitudinal direction, a mechanism 406 for adjusting the vertical position of the vehicle seat, and a mechanism 408 for positioning the vehicle seat in the 20 vertical direction.

The vehicle seat comprises a pair of side frames S each extending in the longitudinal direction of the vehicle, front and rear pipes F, R each connecting the pair of side frames, a seat cushion C fixed on the vehicle (not shown), and a seat back (not shown) mounted on the seat cushion C via a recliner (not shown) so as to be reclined relative to the seat cushion C. Since the slide structure 400 of the vehicle seat is provided on the side frame S of the seat cushion C, the entire vehicle seat including the seat back can be adjustably positioned by the fact that the longitudinal and vertical position of the seat cushion C can be adjusted and positioned.

As shown in FIG. 1, since the slide structure 400 of the vehicle seat is configured in a symmetrical manner with respect to a central line in the longitudinal direction except for the fact that a belt bracket 411 including a belt buckle 438 into which a passenger belt fits is provided on the one of the pair of the rail structures 410, one of the pair of the rail structures 410 will be explained about, and as to the other thereof, the reference numbers same as those attached to the elements in the one thereof are attached to the same elements, and the explanation about the other thereof is omitted instead.

Each of the pair of the rail structures 410 is made of steal and comprises a stationary outer rail 416 fixed on a vehicle floor and extending in the longitudinal direction, and a movable inner rail 418 fixed on a seat cushion C and extending in the longitudinal direction. More specifically, the pair of the rail structures 410 are spaced apart from each other in the widthwise direction with a predetermined distance in accordance with the width of the seat cushion C. In each of the pair of the rail structures 410, the stationary outer rail 416 is disposed outside in the widthwise direction of the vehicle, while the movable inner rail 418 is disposed inside in the widthwise direction of the vehicle.

The stationary outer rail 416 is at its end portions supported by and thus fixed on a pair of legs 414A,B, respectively, which are spaced apart from each other in the longitudinal direction and each of which serves as a rail mounting bracket, while the movable inner rail 418 fits over the stationary outer rail 416. In view of a space of the floor on the front side on which the slide structure 400 of the vehicle seat is disposed, the length of each of the movable inner rail 418 and the stationary outer rail 416 may be appropriately determined taking into consideration a situation in which the movable inner rail 418 is disposed to be the most rear position and the most front position of the vehicle relative to the stationary outer rail 416.

Figure 2:
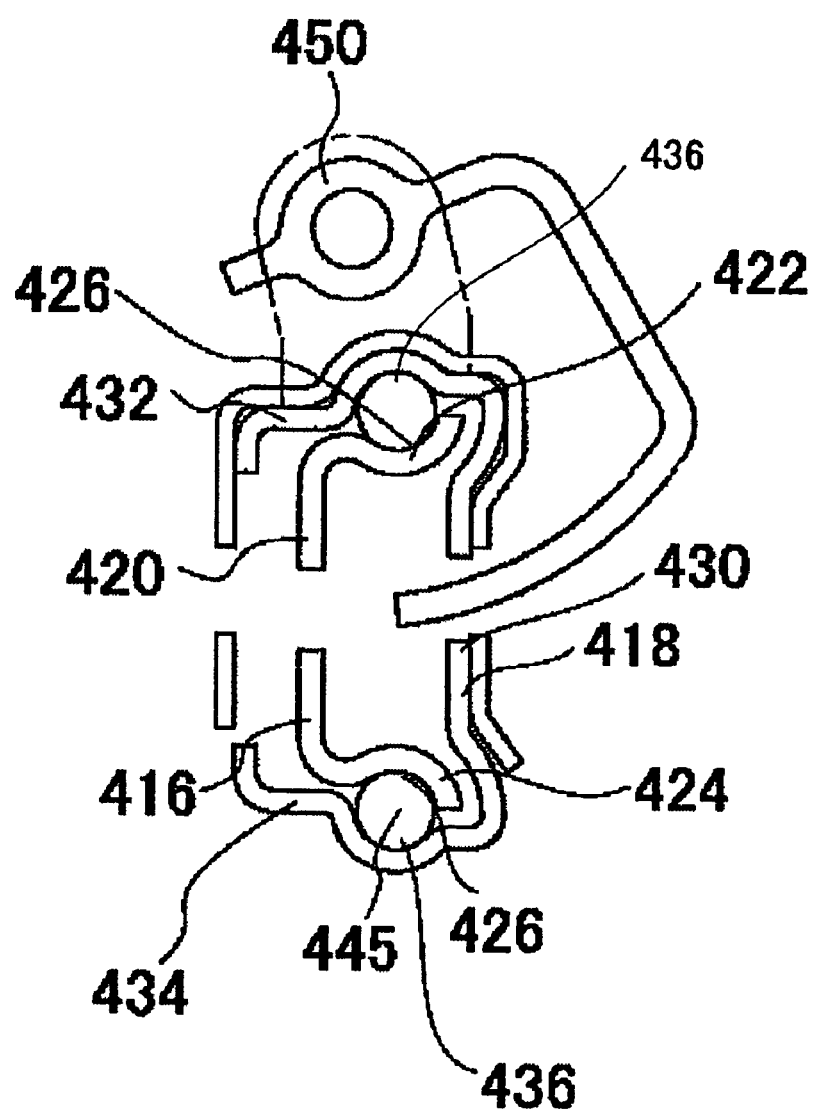
FIG. 2 is a general cross-sectional view showing a situation in which a movable inner rail is disengaged from a stationary outer rail in the slide structure of a vehicle seat of the embodiment of the present invention.
Figure 3:
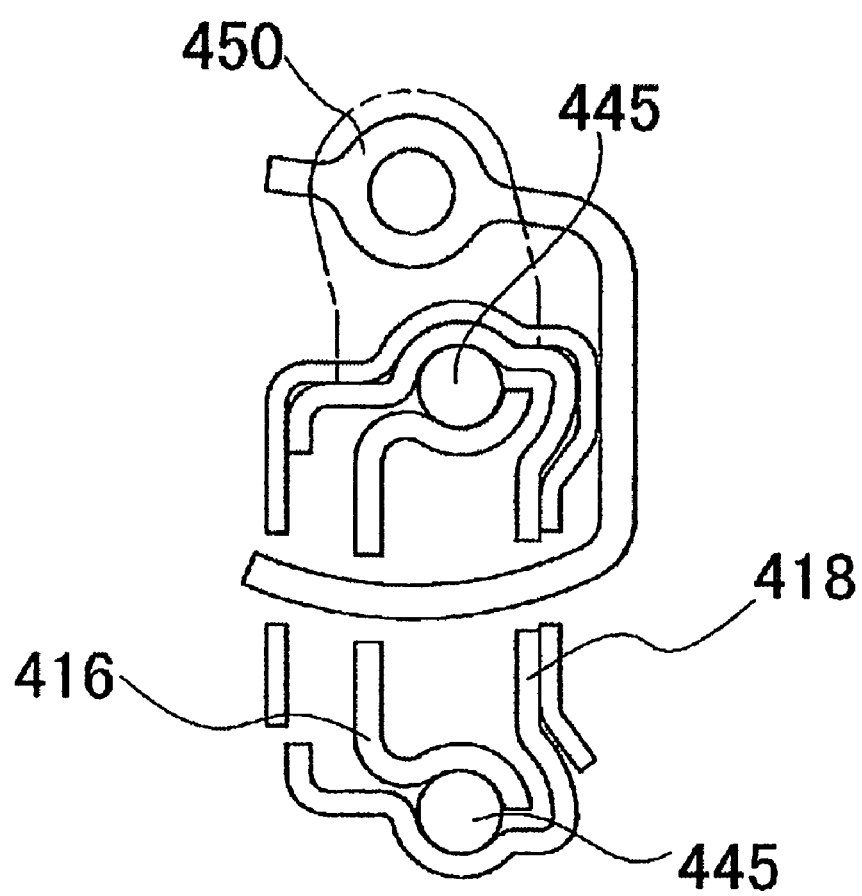
FIG. 3 is a general cross-sectional view showing a situation in which a movable inner rail is engaged by a stationary outer rail in the slide structure of a vehicle seat of the embodiment of the present invention.

As shown in FIGS. 2 and 3 (in both Figs., the left side in the figure means the outside of the vehicle), the stationary outer rail 416 includes a stationary side surface 420 extending in the longitudinal direction along the vertical direction, a first protruding stationary upper surface 422 laterally protruding from one of side edges of the stationary side surface 420, and a second protruding stationary lower surface 424 laterally protruding from the other of side edges of the stationary side surface 420 to form a substantially C-shaped cross-section. Each of the first protruding stationary upper surface 422 and the second protruding stationary lower surface 424 includes at its outer surface a second arcuate cross-sectional groove 426 extending in the longitudinal direction. The second arcuate cross-sectional groove 426 cooperates with a first arcuate cross-sectional groove 436 provided on the movable inner rail 418 (which is explained about below) to form a guide groove for guiding a ball. Accordingly, a shape of the arcuate cross-section of each of the above grooves may be determined in view of the above aspect.

Figure 4:
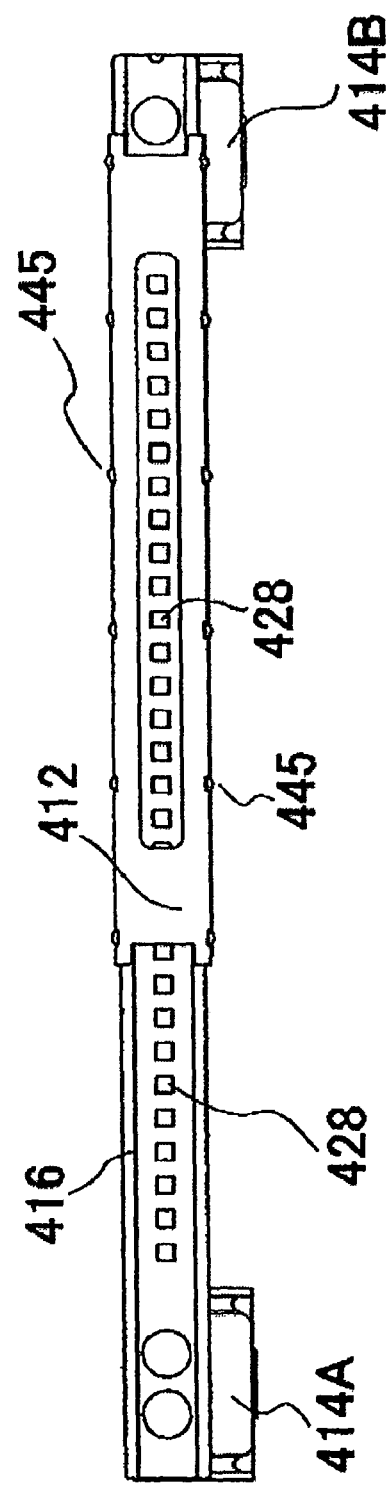
FIG. 4 is a general side view showing a situation in which a retainer is mounted on a stationary outer rail in the slide structure of a vehicle seat of the embodiment of the present invention.

As shown in FIG. 4, a plurality of stationary locking holes 428 spaced apart from each other in the longitudinal direction with a predetermined distance are provided on the stationary outer rail 416. The number of the stationary locking holes 428 may be appropriately determined in view of a range in which the movable inner rail 418 moves in the longitudinal direction relative to the stationary outer rail 416.

On the other hand, as shown in FIGS. 2 and 3, the movable inner rail 418 fits over the stationary outer rail 416 with the opening portions formed by the respective C-shaped cross-sections facing each other. The movable inner rail 418 includes a movable side surface 430 extending in the longitudinal direction along the vertical direction, a first protruding stationary upper surface 432 laterally protruding from one of side edges of the movable side surface 430, and a second protruding stationary lower surface 434 laterally protruding from the other of side edges of the movable side surface 430 to form a substantially C-shaped cross-section. Each of the first protruding movable upper surfaces 432 and the second protruding stationary lower surface 434 includes at its inner surface a first arcuate cross-sectional groove 436 extending in the longitudinal direction.

As shown in FIG. 1, the movable inner rail 418 is fixed on the side frame S of the seat cushion C through a parallel link mechanism of the mechanism 406 for adjusting the vertical position of the vehicle. In the pair of the rail structures 410, as described above, the belt buckle 438 is provided on the one of the movable inner rail 418 at the rear end portion of the vehicle. More specifically, the movable inner rail 418 is disposed outside of the corresponding side frame S in the widthwise direction with a clearance of a few millimeters between the movable inner rail 418 and the side frame S. In a case where the level of the corresponding side frame S is lowered by the mechanism 406 for adjusting the vertical position of the vehicle, so that the side frame S is located lateral to the movable inner rail 418, the movable inner rail 418 is caused to be flexed toward the corresponding side frame S due to the component of the belt load in the widthwise direction on the condition that the belt load is transmitted to the rear end portion of the movable inner rail 418 through the buckle portion upon the collision of the vehicle, for instance. In such a case, the movable inner rail 418 contacts the side surface of the corresponding side frame S at its intermediate position in the longitudinal direction, and as a result, a force oriented opposite to the component of the belt load in the widthwise direction is generated on the front end portion of the movable inner rail 418 with such an intermediate position being a fulcrum.

A plurality of movable locking holes (not shown) which are spaced apart from each other in the longitudinal direction with a distance same as that between the adjacent stationary locking holes 428 are provided on the movable inner rail 418. Four movable locking holes are provided in view of the relationship between a locking plate 454 and movable locking holes, however, the number of the movable locking holes is not limited to four, less than four may be adopted so long as the movable inner rail 418 can be reliably locked against the stationary outer rail 416.

Figure 5:
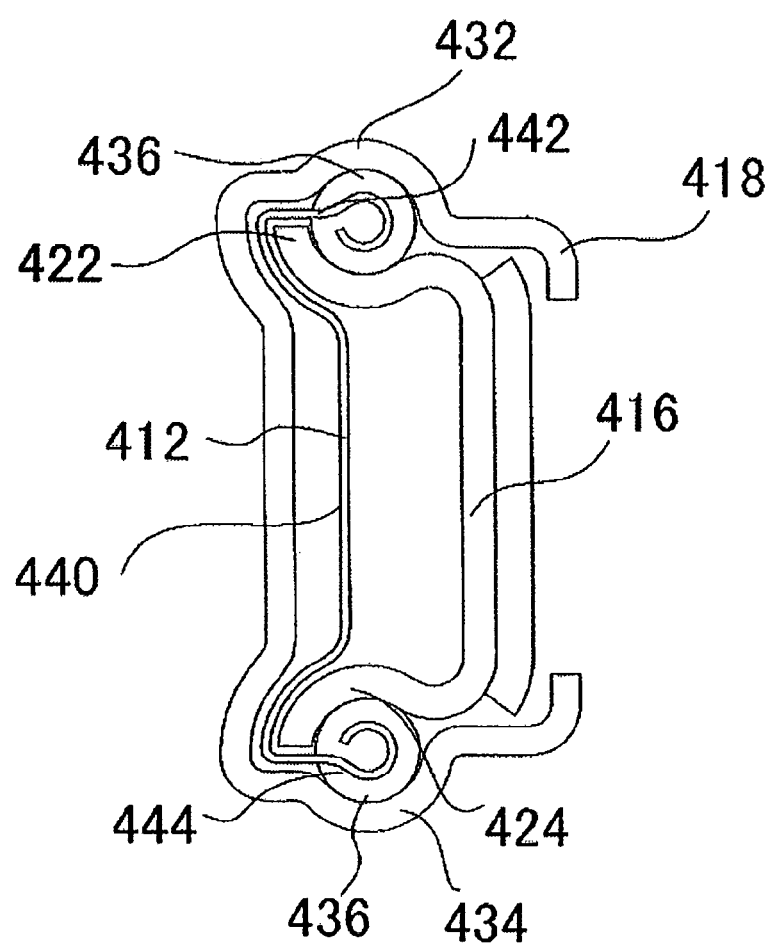
FIG. 5 is a cross-sectional view showing a retainer in the slide structure of a vehicle seat of the embodiment of the present invention.
Figure 6:
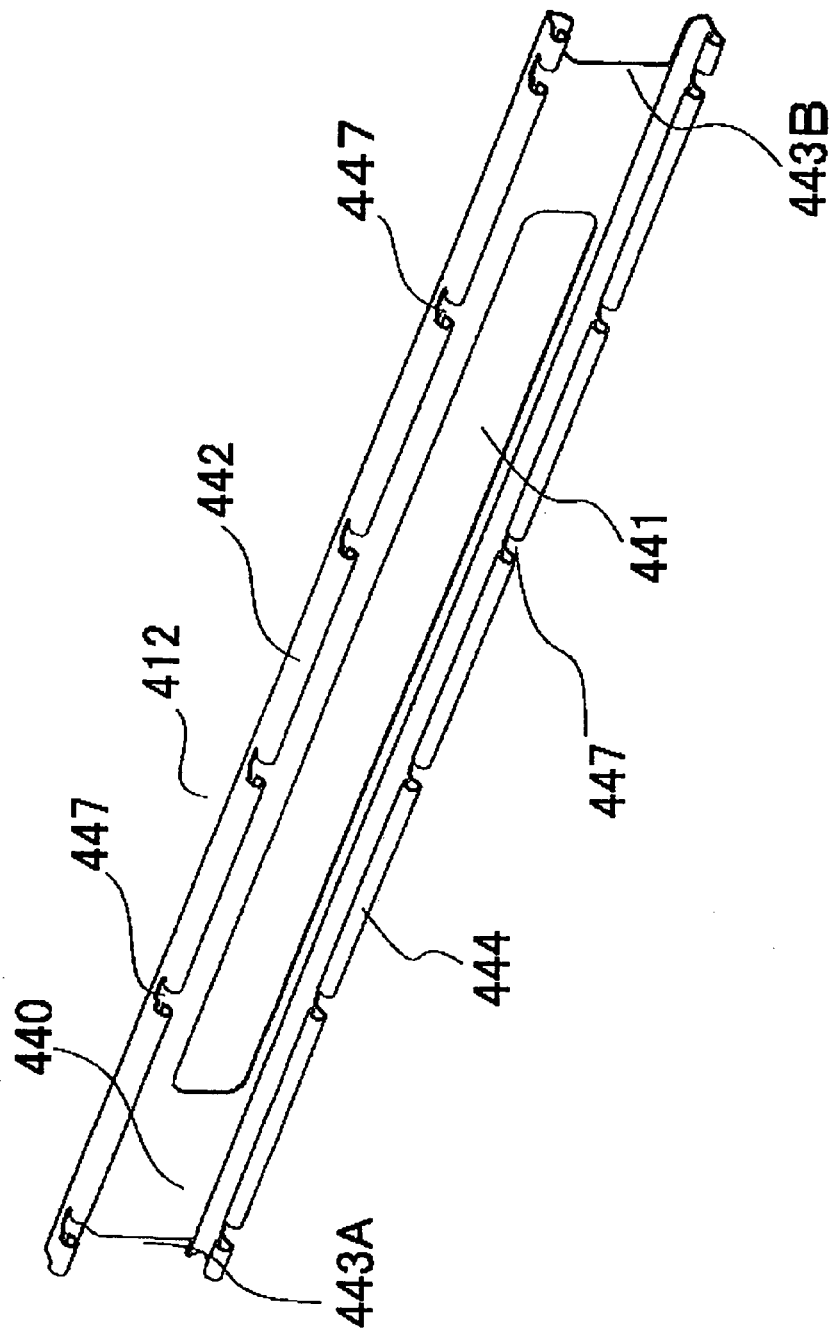
FIG. 6 is a perspective view showing a retainer in the slide structure of a vehicle seat of the embodiment of the present invention.

As to a retainer 412, as shown in FIG. 5 (in this figure, the left side indicates the inside of the vehicle), the retainer 412 extending in the longitudinal direction is provided between the stationary outer rail 416 and the movable inner rail 418. As shown in FIG. 6, the retainer 412 includes a retainer side surface 440 extending in the longitudinal direction along the vertical direction, a plurality of first protruding stationary upper surfaces 442 which are spaced apart from each other in the longitudinal direction and each of which laterally protruding from one of side edges of the retainer side surface 440, and a plurality of second protruding stationary lower surfaces 444 which are spaced apart from each other in the longitudinal direction and each of which laterally protruding from the other of side edges of the retainer side surface 440. More specifically, as shown in FIG. 5, a concave portion which extends in the longitudinal direction and is dented toward an inner surface of the stationary outer rail 416 is provided on the retainer side surface 440, which forms an M-shaped cross-section. This allows for the retainer 412 to move in the longitudinal direction while it is guided by the first protruding stationary upper surface 422 and the second protruding stationary lower surface 424 of the stationary outer rail 416, and yet its side surface is kept disengaged from the movable inner rail 418.

As shown in FIG. 6, as described above, an elongated opening 441 extending in the longitudinal direction is provided on the retainer side surface 440 of the retainer 412. The elongated opening 441 includes a front end edge 443A and a rear end edge 443B. The longitudinal length of the elongated opening 441 may be appropriately determined in view of the fact that the strength of the retainer 412 is sufficiently secured and yet the weight thereof is decreased.

As shown in FIG. 5, the retainer 412 is positioned relative to the stationary outer rail 416 with the opening portions formed by the respective C-shaped cross-sections facing each other and the plurality of first retainer protruding upper surfaces 442 being interposed between the first protruding movable upper surface 432 and the first protruding stationary upper surface 422, while the plurality of second retainer protruding lower surfaces 444 being interposed between the second protruding movable lower surface 434 and the second protruding stationary lower surface 424.

As shown in FIG. 6, each of the plurality of the first retainer protruding upper surfaces 442 and the plurality of second retainer protruding lower surfaces 444 includes perforated holes 447 each retaining a ball 445. This causes the ball 445 to roll between the first protruding movable upper surface 432 and the first protruding stationary upper surface 422 and between the second protruding movable lower surface 434 and the second protruding stationary lower surface 424, whereby the movable inner rail 418 along with the retainer 412 can be moved in the longitudinal direction relative to the stationary outer rail 416.

As stated above, the movable side surface 430, the stationary side surface 420 and the retainer side surface 440 are all oriented in the vertical direction, whereby each of the movable outer rail 416 and the stationary inner rail 418 is disposed so as to form an elongated cross-section in the vertical direction. This allows for a section modulus to be effectively secured with respect to a bending moment about a neutral line in the widthwise direction in its vertical cross-section of the rail, as compared with the rail with the elongated cross-section in the horizontal direction.

Since the mechanism 404 for positioning the vehicle seat in the longitudinal direction, the mechanism 406 for adjusting the vertical position of the vehicle seat, and the mechanism 408 for positioning the vehicle seat in the vertical direction of are all conventional type, the explanation thereabout is omitted.

Figure 7:
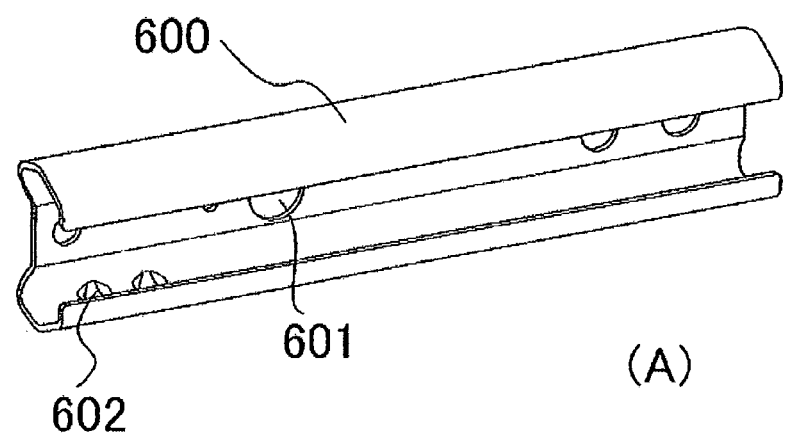
FIG. 7 is a perspective view showing a reinforcing bracket of the movable inner rail in the slide structure of a vehicle seat of the embodiment of the present invention.
Figure 7:
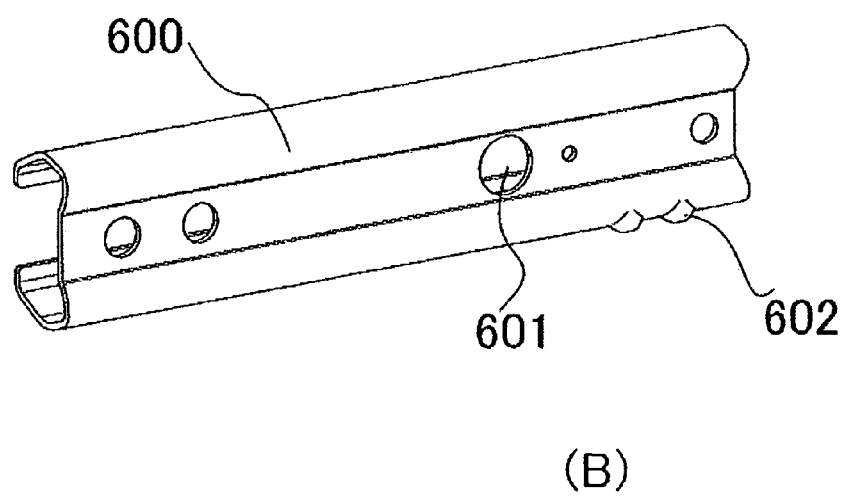
Figure 8:
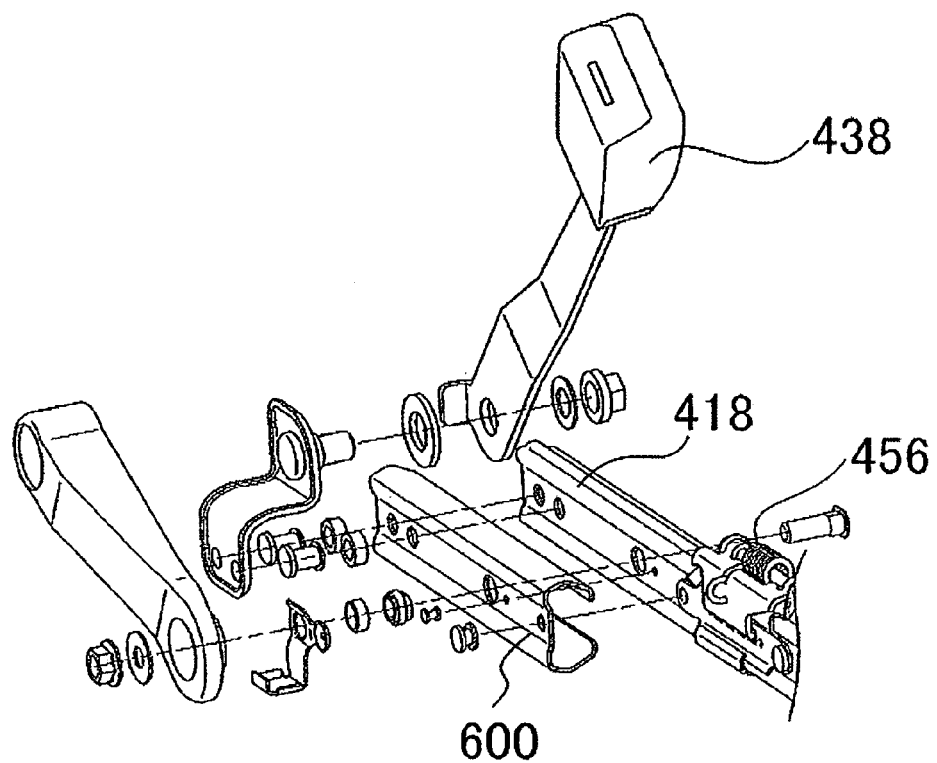
FIG. 8 is an exploded view showing a portion around a belt buckle of the movable inner rail in the slide structure of a vehicle seat of the embodiment of the present invention.

As shown in FIGS. 7 and 8, a bracket 600 for reinforcing the movable inner rail is provided on the movable inner rail 418 disposed inside of the vehicle on which the belt buckle 438 is provided. More specifically, as shown in FIG. 8, the bracket 600 for reinforcing the movable inner rail is provided on the rear end portion of the movable inner rail 418 so as to closely attach to a portion of the movable inner rail 418 corresponding to the first arcuate cross-sectional groove 436 to be applied to said portion from outside.

As shown in FIG. 7, the bracket 600 for reinforcing the movable inner rail is a plate with a substantially C-shaped cross-section and includes at its side surface openings 601 in view of the decrease of the weight and at its protruding lower surface protruding from a lower edge of the side surface a reinforcing bead 602 for preventing deformation of the movable inner rail 418. The bracket 600 for reinforcing the movable inner rail is provided on a portion which overhangs rearwardly from the leg 414B when the movable inner rail 418 is located to be the most rearward position in the longitudinal direction relative to the stationary outer rail 416. The thickness of the bracket 600 for reinforcing the movable inner rail is set to be the one which can effectively prevent the first arcuate cross-sectional groove 436 by the fact that it is applied to the first arcuate cross-sectional groove 436 from outside when a turning force acts on the first arcuate cross-sectional groove 436 so as to flatten it from being flattened so as to resist such a rotational force.

Figure 9:
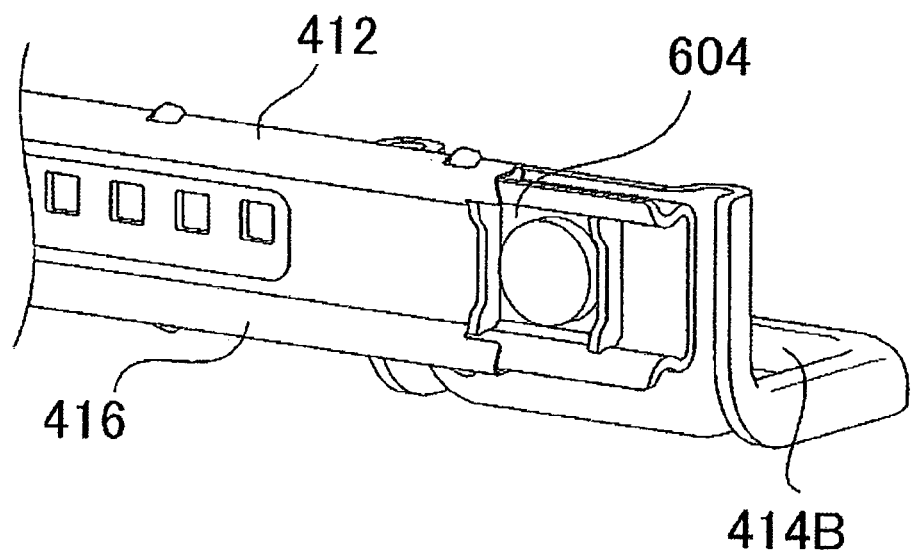
FIG. 9 is a partial perspective view showing a situation in which a bracket for preventing deformation of a stationary outer rail in the slide structure of a vehicle seat of the embodiment of the present invention is mounted.
Figure 10:
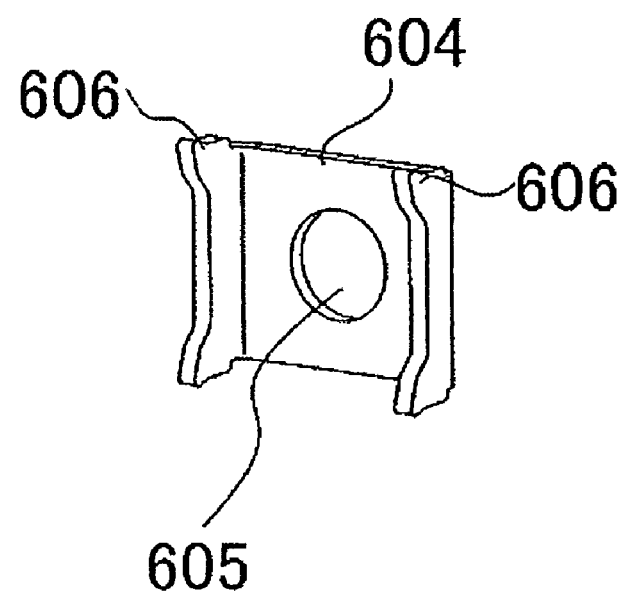
FIG. 10 is a partial perspective view showing a bracket for preventing deformation of a stationary outer rail in the slide structure of a vehicle seat of the embodiment of the present invention.
Figure 11:
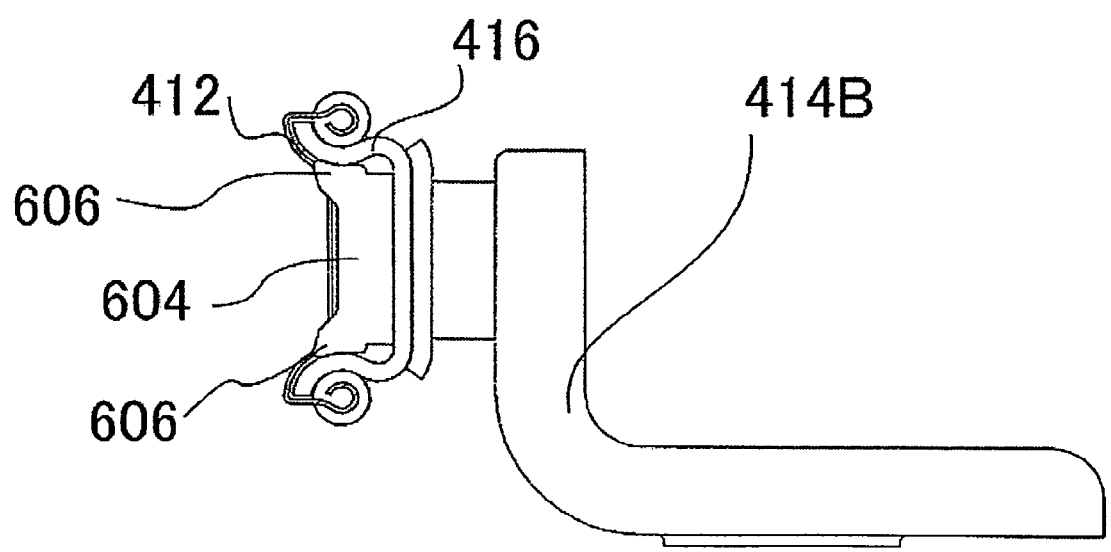
FIG. 11 is a partial side view showing a situation in which a bracket for preventing deformation of a stationary outer rail in the slide structure of a vehicle seat of the embodiment of the present invention is mounted.

On the other hand, as shown in FIGS. 9 to 11, a bracket 604 for preventing deformation of the stationary outer rail is provided on the rear end portion of the stationary outer rail 416 so as to be closely attached to a portion of the stationary outer rail 416 corresponding to the second arcuate cross-sectional groove 426 to be applied to said portion from inside. The bracket 604 for preventing deformation of the stationary outer rail is a plate which includes openings 605 in view of the decrease of the weight and at its respective ends in the longitudinal direction applied portions 606 to be applied to the stationary outer rail 416. The bracket 604 for preventing deformation of the stationary outer rail along with the stationary outer rail 416 is fastened to the leg 414B for fixing the stationary outer rail 416 on the vehicle floor. The thickness of the bracket 604 for preventing deformation of the stationary outer rail is set to be the one which can effectively prevent the first arcuate cross-sectional groove 426 by the fact that it is applied to the first arcuate cross-sectional groove 426 from inside when a turning force acts on the first arcuate cross-sectional groove 426 so as to flatten it, from being flattened so as to resist such a rotational force.

The operation of the slide structure 400 of the vehicle seat is now described in detail with reference to the drawings.

Firstly, when the longitudinal position of the vehicle seat is adjusted, the locking teeth 455 of the locking plate 454 are removed from the movable locking holes of the movable inner rail 418 and the stationary locking holes 428 of the stationary outer rail 416 by raising the actuation lever 446, so that these rails are disengaged from the locking plate 454. As shown in FIG. 2, this causes the movable inner rail 418 to be freely moved in the longitudinal direction relative to the stationary outer rail 416.

Then, the movable inner rail 418 is moved relative to the stationary outer rail 416 in the longitudinal direction to a target position in the longitudinal direction, forwardly, for instance. In such a case, the movable inner rail 418 can be slidably and smoothly moved relative to the stationary outer rail 416 due to the fact that the retainer 412 itself is caused to move in the direction in which the movable inner rail 418 moves by each of the balls 445 rolling between the first protruding stationary upper surface 422 and the first protruding movable upper surface 432 and between the second protruding stationary lower surface 424 and the second protruding movable lower surface 434 with being retained in the perforated holes 447 of the first retainer protruding upper surfaces 442 and the second retainer protruding lower surfaces 444.

Then, by lowering the actuation lever 446, as shown in FIG. 3, the movable inner rail 418 having reached the target position can be locked against and thus fixed on the stationary outer rail 416 by making the locking teeth 455 of the locking plate 454 penetrate into the movable locking holes 421 of the movable inner rail 418 and the stationary locking holes 428 of the stationary outer rail 416 corresponding to the target position.

As stated above, according to the above slide structure 400 of the vehicle seat, in a case where the longitudinal position of the seat cushion C is adjusted, the vehicle seat fixed on the movable inner rail 418 can be positioned at a desired position in the longitudinal direction of the vehicle by moving the movable inner rail 418 relative to the stationary outer rail 416 fixed on the vehicle floor, in the longitudinal direction in a sliding manner, while the vertical position of the seat cushion C can be adjusted by moving the seat cushion C relative to the movable inner rail 418 by the mechanism for adjusting the vertical position of the seat cushion C.

Figure 12:
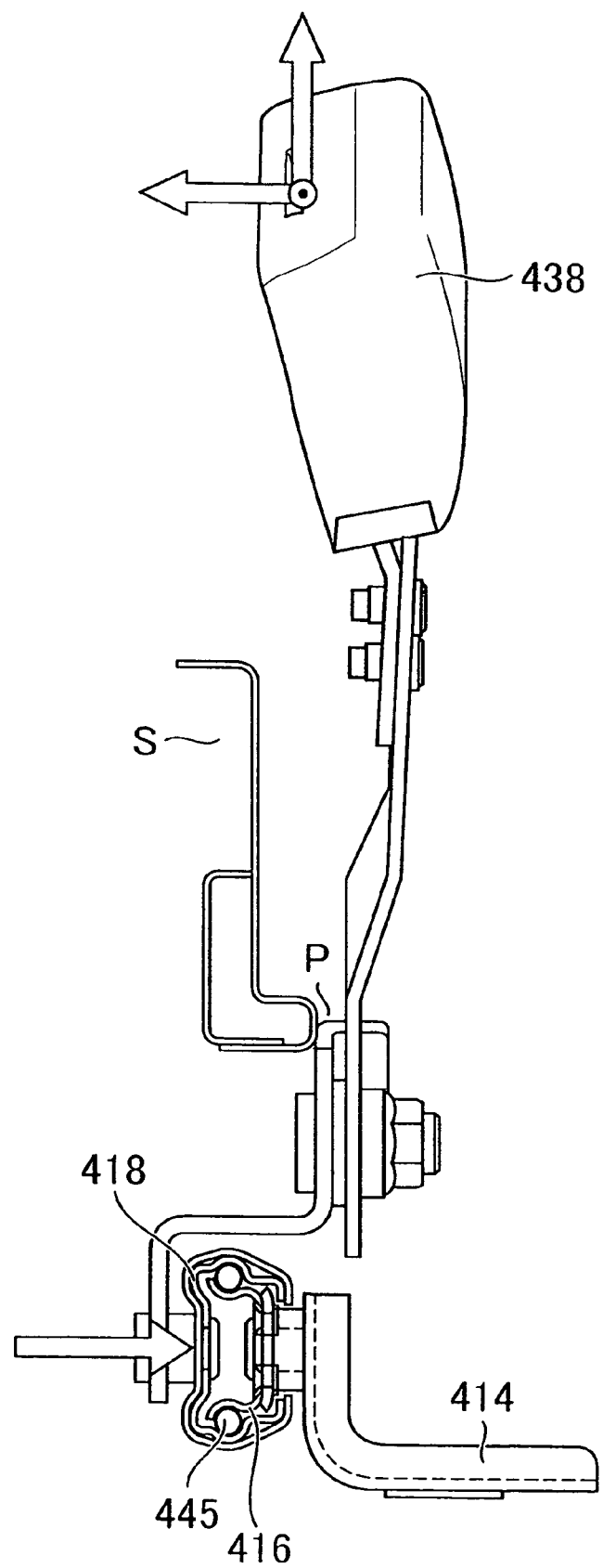
FIG. 12 is a general view showing a situation in which a belt load is input in the slide structure of a vehicle seat of the embodiment of the present invention.

In such a case, the belt load acts on the rear portion of the movable inner rail 418 through the belt buckle for the passenger upon the collision of the vehicle, for instance, since the belt extends inwardly, forwardly and diagonally from the lower end of the one side portion of the seat back to the other side portion thereof, the belt load inevitably consists of a component in the widthwise direction of the vehicle, one in the vertical direction of the vehicle, and one in the longitudinal direction of the vehicle (refer to arrows in FIG. 12). Especially, the component in the widthwise direction acts inwardly in the widthwise direction. Due to such a component in the widthwise direction, the movable inner rail 418 extending in the longitudinal direction is deformed so as to be flexed toward the outer side surface of one of the pair of side frames S of the seat cushion C disposed inside of the movable inner rail 418, to contact the outer side surface of the one of the pair of the side frames S at its intermediate position in the longitudinal direction. A force oriented in the direction opposite to the component of the belt load in the widthwise direction acts on the front end portion of the movable inner rail 418 with a position contacting the outer side surface of one of the pair of the side frames S being a fulcrum. In other words, a force is applied outwardly in the widthwise direction to the movable inner rail 418.

Figure 13:
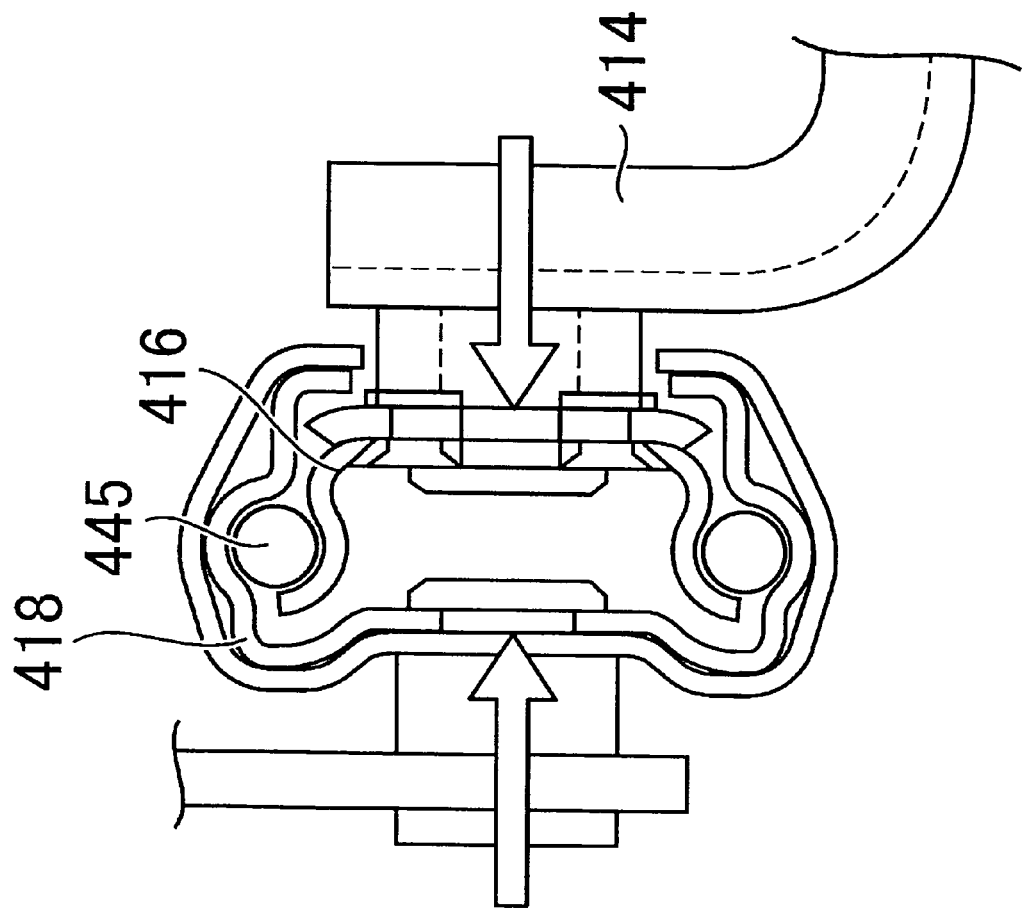
FIG. 13 is a view showing a front portion of a vehicle in FIG. 12.
Figure 14:
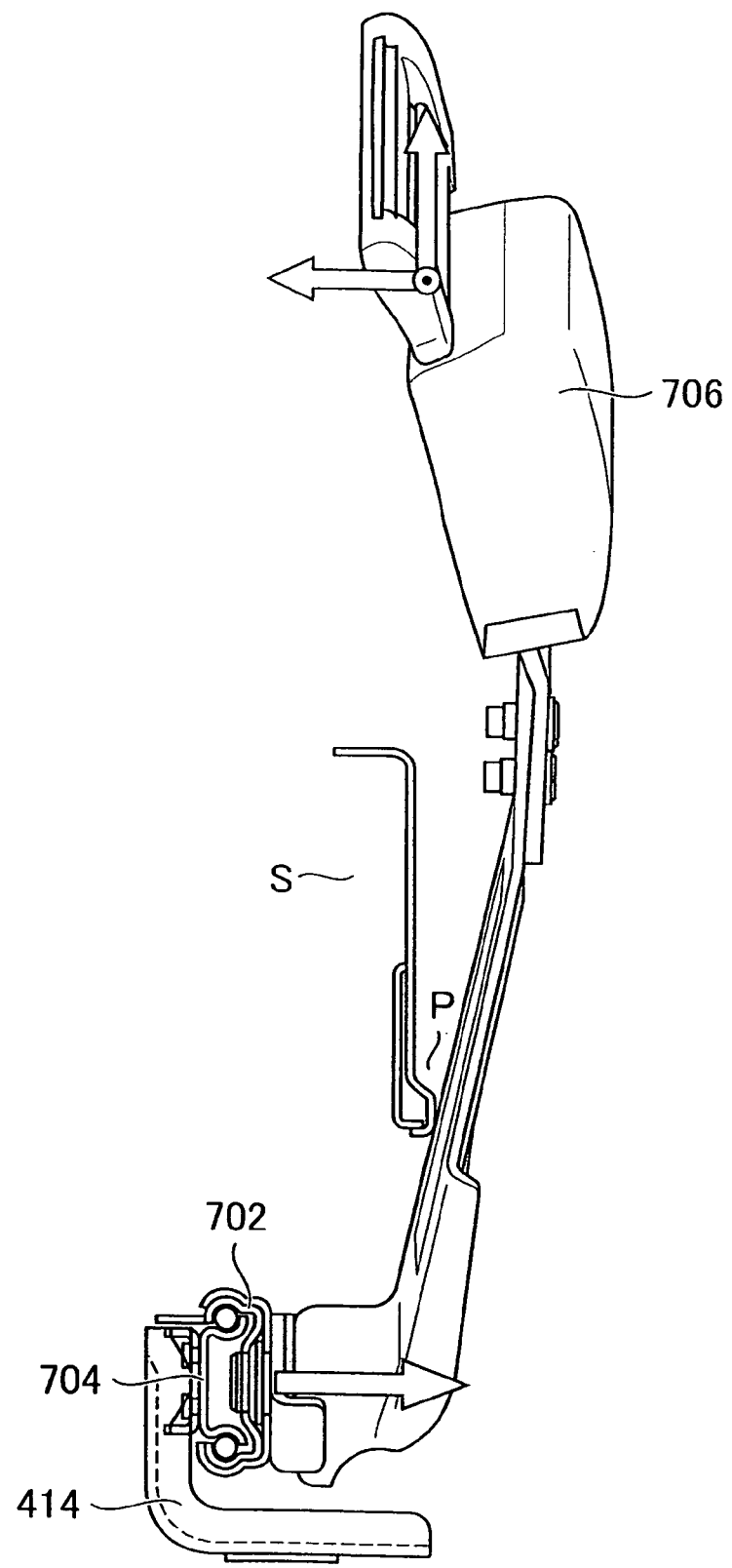
FIG. 14 is a general view showing a situation in which a belt load is input in a conventional slide structure of the vehicle seat.
Figure 15:
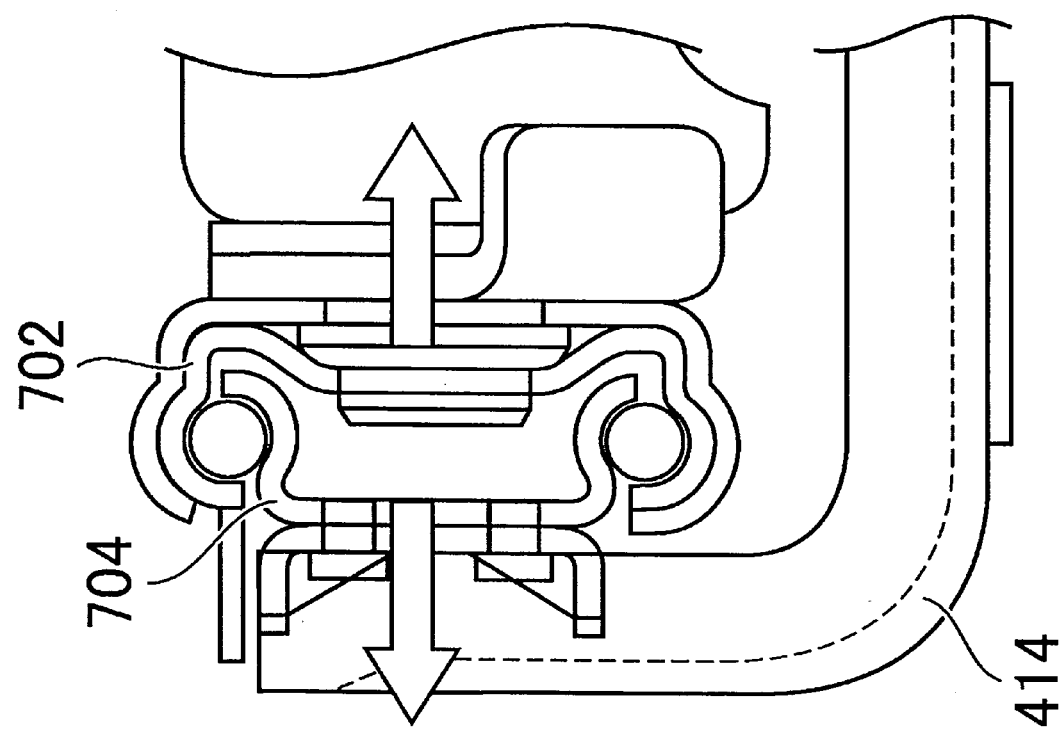
FIG. 15 is a view showing a front portion of a vehicle in FIG. 14.

In this connection, since the movable inner rail 418 is disposed inside in the widthwise direction of the stationary outer rail 416 fixed and thus supported by the leg from outside in the widthwise direction, and the movable inner rail 418 fits with the stationary outer rail 416 in such a way that the open portion of the C-shaped cross-section of the movable inner rail 418 is oriented outwardly in the widthwise direction, while the open portion of the C-shaped cross-section of the stationary outer rail 416 is oriented inwardly in the widthwise direction, due to the load outwardly in the widthwise direction, as shown in FIG. 13, a force acts on the movable inner rail 418 with its opening portion of the C-shaped cross-section being oriented toward the stationary outer rail 416, while another force as a reaction force to said force acts on the stationary outer rail 416 with its opening portion of the C-shaped cross-section being oriented toward the movable inner rail 418, so that the fitting relationship between the movable inner rail 418 and the stationary outer rail 416 can be maintained.

Accordingly, the conventional phenomenon in which the fitting relationship between the movable and stationary rails is removed due to the belt load upon the collision of the vehicle so that the sliding function of the rails is lost can be effectively prevented.

In addition, a rotating moment which rotates the rail about the longitudinal axis of the vehicle in the vertical cross-section of the rail structure acts on the rail structure, so that a force acts thereon in the direction in which the first arcuate cross-sectional groove 436 provided on the first protruding movable surface 432 and the second protruding movable surface 434 of the movable inner rail 418, and the second arcuate cross-sectional groove 426 provided on the first protruding stationary surface 422 and the second protruding stationary surface 424 of the stationary outer rail 416 are flattened. Especially, the balls 445 are caused to be slipped off by the fact that the second arcuate cross-sectional groove 426 situated to be the lowermost position in the vertical elongated cross-section is deformed so as to lose the groove. In a case where the movable inner rail 418 is situated to be the most rear position in the longitudinal direction relative to the stationary outer rail 416, in particular, such a phenomenon can be readily brought about because the rear end portion of the movable inner rail 418 overhangs the stationary outer rail 416, so that so-called a cantilever condition is created.

However, since the bracket 600 for reinforcing the movable inner rail 418 is provided on the rear end portion of the movable inner rail 418 so as to closely attach to its portion corresponding to the first arcuate cross-sectional groove 436 to be applied to said portion from outside, while the reinforcing bead 602 for preventing deformation of the movable inner rail 418 is provided on its lower portion, the first arcuate cross-sectional groove 436 can resist the above deformation force to be prevented from being flattened. On the other hand, since the bracket 604 for preventing deformation of the stationary outer rail is provided on the rear end portion of the stationary outer rail 416 so as to closely attach to its portion corresponding to the second arcuate cross-sectional groove 426 to be applied to said portion from inside, the second arcuate cross-sectional groove 426 can resist the above deformation force to be prevented from being flattened. Such being the case, in a case where the impact load is applied to the rail of the slide structure of the vehicle seat, the slip-off of the balls 445 can be effectively prevented by restricting the loss of the first and second arcuate cross-sectional grooves.

According to the slide structure of the present invention, since a force is generated due to a load outwardly in the widthwise direction at the front portion of the vehicle originated from a belt load at the rear portion thereof upon the collision, and acts on both of the movable inner rail and the stationary outer rail so as to maintain the fitting relationship between both rails, a conventional phenomenon in which such a fitting relationship is removed due to the belt load upon the collision so that the slide function associated with both rails is lost can be effectively prevented, whereby the present invention is advantageously applicable to an industry related to general vehicles.

As described above, the preferred embodiments of the present invention were described in detail, however, it is evident that those skilled in the art could modify or change the embodiments in various manners without departing from the scope of the present invention.

For instance, in the embodiment, the sliding structure is applied to the automobile, however, it may be applied to general transportation vehicles such as railway vehicles, ships, airplanes. Further, in a case where the sliding structure is applied to the automobile, it may be applied to either a rear sheet or a front sheet, or to both sheets.

The invention claimed is:

1. A slide structure of a vehicle seat comprises a stationary outer rail which is fixed on a vehicle floor and extends in a longitudinal direction of a vehicle,
   a movable inner rail which fits with said stationary outer rail and is slidable in the longitudinal direction of the vehicle relative to said stationary outer rail and is fixed on a seat cushion and on a rear end portion of which a belt buckle for a passenger is fixed, and
   means for locking said movable inner rail which locks said movable inner rail against said stationary outer rail in the longitudinal direction,
   said movable inner rail includes a movable side surface extending in the longitudinal direction of the vehicle to form a substantially C-shaped cross-section,
   said stationary outer rail includes a stationary side surface extending in the longitudinal direction of the vehicle to form a substantially C-shaped cross-section,
   said movable inner rail fits with said stationary outer rail in such a way that opening portions formed by the respective C-shaped cross-sections face each other,
   a retainer extending in the longitudinal direction is provided between said stationary outer rail and said movable inner rail,
   said retainer includes a retainer side surface portion extending in the longitudinal direction to form a substantially C-shaped cross-section, said retainer includes a retaining portion for retaining a ball, whereby said movable inner rail can be moved in the longitudinal direction along with said retainer relative to said stationary outer rail by said ball rolling between said stationary outer rail and said movable inner rail, said movable side surface, said stationary side surface and said retainer side surface portion are all disposed along a vertical direction of the vehicle, whereby each of said stationary outer rail and said movable inner rail is arranged to form a vertically elongated cross-section, said movable inner rail includes a first arcuate cross-sectional groove, said stationary outer rail includes a second arcuate cross-sectional groove, a guiding groove for guiding the ball in the longitudinal direction is formed by said first arcuate cross-sectional groove and said second arcuate cross-sectional groove.

2. The slide structure of the vehicle seat according to claim 1, wherein said movable inner rail further comprises a first protruding movable surface protruding from the one of the edges of said movable side surface, and a second protruding movable surface protruding from the other of the edges of said movable side surface, said stationary outer rail further comprises a first protruding stationary surface protruding from the one of the edges of said stationary side surface, and a second protruding stationary surface protruding from the other of the edges of said stationary side surface, said retainer further comprises a plurality of first retainer protruding upper surfaces, each protruding from the one of the edges of said retainer side surface and spaced part from each other with a predetermined distance in the longitudinal direction, and a plurality of second retainer protruding lower surfaces protruding from the other of the edges of said retainer side surface and spaced part from each other with a predetermined distance in the longitudinal direction, said retainer is positioned in such a way that said plurality of first retainer protruding upper surfaces are disposed between said first protruding movable surface and said first protruding stationary surface, while said plurality of second retainer protruding lower surfaces are disposed between said second protruding movable surface and said second protruding stationary surface, said retaining portion is formed on said plurality of first retainer protruding upper surfaces and said plurality of second retainer protruding lower surfaces, respectively, whereby said movable inner rail can be moved in the longitudinal direction along with said retainer relative to said stationary outer rail by said ball rolling between said first protruding movable surface and said first protruding stationary surface, and between said second protruding movable surface and said second protruding stationary surface, said first arcuate cross-sectional groove is formed on said first protruding movable surface and said second protruding movable surface, respectively, said second arcuate cross-sectional groove is formed on said first protruding stationary surface and said second protruding stationary surface, respectively.

3. The slide structure of the vehicle seat according to claim 2, wherein said movable inner rail fits over said stationary outer rail in such a way that the opening portions formed by the respective C-shaped cross-sections face each other, said retainer is disposed on said stationary outer rail in such a way that the opening portions formed by the respective C-shaped cross-sections face each other, said first arcuate cross-sectional grooves are formed on the inner surfaces of said first and second protruding movable surfaces, respectively, while said second arcuate cross-sectional grooves are formed on the outer surfaces of said first and second protruding stationary surfaces, respectively.

4. The slide structure of the vehicle seat according to claim 2, wherein said movable inner rail fits into said stationary outer rail in such a way that the opening portions formed by the respective C-shaped cross-sections face each other, said retainer is disposed on said movable inner rail in such a way that the opening portions formed by the respective C-shaped cross-sections face each other, said first arcuate cross-sectional grooves are formed on the outer surfaces of said first and second protruding movable surfaces, respectively, while said second arcuate cross-sectional grooves are formed on the inner surfaces of said first and second protruding stationary surfaces, respectively.

5. The slide structure of the vehicle seat according to claim 2, wherein a bracket for reinforcing said movable inner rail which is closely attached to a portion corresponding to said first arcuate cross-sectional groove so as to be applied to said portion from outside is provided on a rear end portion of said movable inner rail, said bracket for reinforcing said movable inner rail includes at its lower surface a reinforcing bead for preventing deformation of said movable inner rail, a bracket for preventing deformation of said stationary outer rail which is closely attached to a portion corresponding to said second arcuate cross-sectional groove so as to be applied to said portion from inside is provided on a rear end portion of said stationary outer rail.

6. The slide structure of the vehicle seat according to claim 5, wherein said stationary outer rail includes at its front and rear sides a stationary bracket fixed on a vehicle floor, respectively, said bracket for reinforcing said movable inner rail is provided on a portion of said movable inner rail which overhangs rearwardly from said stationary bracket at the rear side when said movable inner rail is located to be the most rear position relative to said stationary outer rail.

7. The slide structure of the vehicle seat according to claim 6, wherein said bracket for reinforcing said movable inner rail is a plate with a substantially C-shaped cross-section.

8. The slide structure of the vehicle seat according to claim 6, wherein said bracket for reinforcing said stationary outer rail is a plate, each of front and rear end portions of which includes a portion which is applied to said stationary outer rail.

9. The slide structure of the vehicle seat according to claim 8, wherein said bracket for reinforcing said stationary outer rail is fastened along with said stationary outer rail to said stationary bracket for fixing said stationary outer rail on the vehicle floor.

* * * * *